US011361372B1

(12) United States Patent
Vickers et al.

(10) Patent No.: US 11,361,372 B1
(45) Date of Patent: Jun. 14, 2022

(54) PAINT PROCUREMENT SYSTEM AND METHOD

(71) Applicant: The Sherwin-Williams Company, Cleveland, OH (US)

(72) Inventors: Meghan L Vickers, Willoughby, OH (US); Pamela A Gillikin, Newbury, OH (US); William E Weber, III, North Ridgeville, OH (US); James D. Bandy, Cleveland, OH (US); Matthew G. Stec, Hudson, OH (US)

(*) Notice: Subject to any disclaimer, the term of this patent is extended or adjusted under 35 U.S.C. 154(b) by 605 days.

(21) Appl. No.: 15/801,381

(22) Filed: Nov. 2, 2017

Related U.S. Application Data (60) Provisional application No. 62/416,183, filed on Nov. 2, 2016.

(51) Int. Cl.
*G06T 11/00* (2006.01)
*G06Q 30/06* (2012.01)
*G06Q 20/20* (2012.01)
*G06Q 20/12* (2012.01)

(52) U.S. Cl.
CPC ......... *G06Q 30/0643* (2013.01); *G06Q 20/12* (2013.01); *G06Q 20/201* (2013.01); *G06T 11/001* (2013.01)

(58) Field of Classification Search
USPC .............................................. 705/14.67, 16
See application file for complete search history.

(56) References Cited

U.S. PATENT DOCUMENTS

| 5,844,542 A | 12/1998 | Inoue et al. |
| 6,502,049 B1 | 12/2002 | Takada et al. |
| 6,526,082 B1 | 2/2003 | Corzine et al. |
| 6,556,303 B1 | 4/2003 | Rangarajan et al. |

(Continued)

FOREIGN PATENT DOCUMENTS

| CA | 2584540 | 9/2001 |
| CN | 2340001 | 9/1999 |

(Continued)

OTHER PUBLICATIONS

Blue Stain, U.S. Department of Agriculture, Forest Service, Forest Products Laboratory, 2 pages. May 2002.

(Continued)

*Primary Examiner* — Fahd A Obeid
*Assistant Examiner* — Reva R Moore
(74) *Attorney, Agent, or Firm* — Patterson Thuente Pedersen, P.A.

(57) ABSTRACT

A method of establishing a paint color to be displayed by a procurement system based on information received from an external punchout site. A formula corresponding to a desired paint color selected by a customer that is not included in a color palate of predefined colors regularly available for purchase from a paint supplier is received. Based on the formula, a standardized color value within a color gamut of the electronic display device is generated for the desired paint color. The standardized color value is stored in a network-accessible database entry specific to the customer to be retrievable by the customer over a communication network for generating a preview of the desired paint color during a subsequent purchase of paint having the desired paint color by the customer over the communication network.

23 Claims, 6 Drawing Sheets

(56) References Cited

U.S. PATENT DOCUMENTS

| | | | |
|---|---|---|---|
| 6,641,696 | B1 | 11/2003 | Edger ton |
| 6,717,584 | B2 | 4/2004 | Kulczycka et al. |
| 6,744,513 | B2 | 6/2004 | Kubo et al. |
| 6,768,814 | B1 | 7/2004 | Spitzer et al. |
| 6,914,613 | B2 | 7/2005 | Marchand et al. |
| 7,042,566 | B2 | 5/2006 | Skierski et al. |
| 7,116,420 | B2 | 10/2006 | Skierski et al. |
| 7,230,707 | B2 | 6/2007 | Ingleson et al. |
| 7,277,202 | B2 | 10/2007 | Chan |
| 7,430,316 | B2 | 9/2008 | Boston et al. |
| 7,953,274 | B2 | 5/2011 | Sara et al. |
| 8,244,032 | B2 | 8/2012 | Sara et al. |
| 8,514,470 | B2 | 8/2013 | Elliot et al. |
| 8,526,082 | B2 | 9/2013 | Shimizu |
| 10,460,474 | B2 | 10/2019 | Peden et al. |
| 2002/0106121 | A1* | 8/2002 | McClanahan ......... H04N 1/603 382/156 |
| 2002/0163640 | A1 | 11/2002 | Masuda |
| 2003/0151611 | A1 | 8/2003 | Turpin et al. |
| 2004/0078299 | A1 | 4/2004 | Down-Logan et al. |
| 2004/0093112 | A1 | 5/2004 | Marchand et al. |
| 2004/0104923 | A1 | 6/2004 | Koyama |
| 2004/0131756 | A1 | 7/2004 | Skierski et al. |
| 2004/0223149 | A1 | 11/2004 | Skierski et al. |
| 2006/0152527 | A1 | 7/2006 | Minchew et al. |
| 2009/0157212 | A1 | 6/2009 | McClanahan et al. |
| 2010/0214421 | A1 | 8/2010 | Qu et al. |
| 2011/0003732 | A1 | 1/2011 | Shimizu |
| 2012/0147390 | A1 | 4/2012 | Elliot et al. |
| 2012/0221418 | A1* | 8/2012 | Smith ................... G06Q 30/02 705/14.67 |
| 2013/0176326 | A1 | 7/2013 | Safaee-Rad |
| 2018/0156663 | A1* | 6/2018 | Farley ..................... G01J 3/462 |
| 2020/0074686 | A1 | 3/2020 | Peden et al. |

FOREIGN PATENT DOCUMENTS

| | | |
|---|---|---|
| CN | 1378643 | 11/2002 |
| CN | 1223176 | 1/2003 |
| CN | 1492388 | 4/2004 |
| CN | 1551613 | 12/2004 |
| CN | 101958991 | 1/2011 |
| EP | 1359399 | 5/2003 |
| FR | 2698982 | 6/1994 |
| JP | 11-269411 | 5/1999 |
| WO | WO0128231 | 4/2001 |

OTHER PUBLICATIONS

Lebow et al., "Classification of Wood Surface Features by Spectral Reflectance", Jan. 1996. Wood and Fiber Science 28(1), 1996. pp. 74-90.

International Search Report dated Jul. 27, 2006 for PCT/US2006/009845.

Examination Report from counterpart Canadian Application No. 2953500 dated Oct. 22, 2018.

Response to Communication pursuant to Rules 70(2) and 70a(2) dated Jan. 8, 2018 from counterpart European Application No. 15 812046.9 filed Jul. 18, 2018.

Extended Search Report from Counterpart European Application No. 15612046.9 dated Dec. 12, 2017.

Examination Report from CA Application No. 2953500 dated Nov. 28, 2017.

Response to Examination Report dated Nov. 28, 2017 from counterpart CA Application No. 2953500 filed May 25, 2018.

International Search Report and Written Opinion from International Application No. PCTUS2015037775 dated Nov. 23, 2015.

International Preliminary Report on Patentability from International Application No. PCTUS2015037775 dated Dec. 27, 2016.

\* cited by examiner

PAINT PROCUREMENT SYSTEM AND METHOD

This application claims the benefit of U.S. provisional application No. 62/416,183 filed on Nov. 2, 2016, the entirety of which is hereby incorporated by reference.

BACKGROUND OF THE INVENTION

1. Field of the Invention

This application relates generally to an electronic procurement system and, more specifically, to a system and method to facilitate the real-time compilation of data concerning paint available to be purchased through commercial accounts.

2. Description of Related Art

Conventional business-to-business ("B2B") commerce websites typically offer a variety of products for sale to commercial customers. Commercial customers often make repeat purchases of products that have been used on previous projects, or of custom products that will be used on future projects. To enable repeat purchases to be made on B2B commerce websites without requiring customers to enter information uniquely identifying products to be purchase, an inventory of custom products and a history of previous purchases can be maintained on the website. However, certain products such as custom colors of paint, for example, may not be capable of accurate reproduction by a computer display due to the displayable color spectrum and possibly other technical limitations of such displays.

Different commercial customers are commonly afforded different purchase prices based on considerations such as the volume of products purchased, the location of the purchase, the market in which the purchased products will be used. However, commercial websites typically display the typical cost of the products available for purchase by any customer, and not the customer price specific to individual customers.

Further, large customers that require a variety of different products from several vendors will often leave one website to look for products believed to be offered on other websites, possible at lower prices. In the course of generating such large orders, customers may leave one site or remain inactive for a predetermined timeout period before the order is completed to look at other sources of the desired products. Leaving a conventional commerce site before finalizing and submitting an order has traditionally caused the customer to lose all progress, requiring the customer to begin generating the order anew.

BRIEF SUMMARY OF THE INVENTION

According to one aspect, the subject application involves a method of maintaining a paint color to be displayed by an electronic display device. The method includes receiving a formula corresponding to a desired paint color selected by a customer that is not included in a color palate of predefined colors regularly available for purchase from a paint supplier. Based on the formula, a standardized color value within a color gamut of the electronic display device is generated for the desired paint color, the standardized color value representing a displayable color that closely approximates the desired paint color when displayed by the electronic display device. The standardized color value is stored in a network-accessible database entry specific to the customer to be retrievable by the customer over a communication network for generating a preview of the desired paint color during a subsequent purchase of paint having the desired paint color by the customer over the communication network.

According to another aspect, the subject application involves a computer program product comprising a computer-usable, non-transitory tangible storage medium having a computer-readable program code embodied therein. The computer-readable program code, when executed, carries out a computer based method that includes receiving a formula corresponding to a desired paint color selected by a customer that is not included in a color palate of predefined colors regularly available for purchase from a paint supplier. Based on the formula, a standardized color value within a color gamut of the electronic display device is generated for the desired paint color, the standardized color value representing a displayable color that closely approximates the desired paint color when displayed by the electronic display device. The standardized color value is stored in a network-accessible database entry specific to the customer to be retrievable by the customer over a communication network for generating a preview of the desired paint color during a subsequent purchase of paint having the desired paint color by the customer over the communication network.

According to another aspect, the subject application involves a method of managing a price of paint available for purchase by a customer through a network-connected procurement system. The method includes establishing a user account for the customer on a punchout site stored by a server that communicates with the procurement system over a communications network. The price of the paint included in a quote entered for the customer into a quote management application executed by a computer terminal connected to the communication network is automatically received by the server, and the price of the paint stored in a record on the punchout site associated with the user account. In response to receiving a request for the price from the procurement system over the communication network, the price of the paint is transmitted by the server to be received by the procurement system.

According to another aspect, the subject application involves a computer program product comprising a computer-usable, non-transitory tangible storage medium having a computer-readable program code embodied therein. The computer-readable program code, when executed, carries out a computer based method of managing a price of paint available for purchase by a customer through a network-connected procurement system. The method includes establishing a user account for the customer on a punchout site stored by a server that communicates with the procurement system over a communications network. The price of the paint included in a quote entered for the customer into a quote management application executed by a computer terminal connected to the communication network is automatically received by the server. The price of the paint received by the server is stored in a record on the punchout site associated with the user account and, in response to receiving a request for the price from the procurement system over the communication network, is transmitted by the server to be received and utilized by the procurement system during the purchase of paint.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Figure 1:
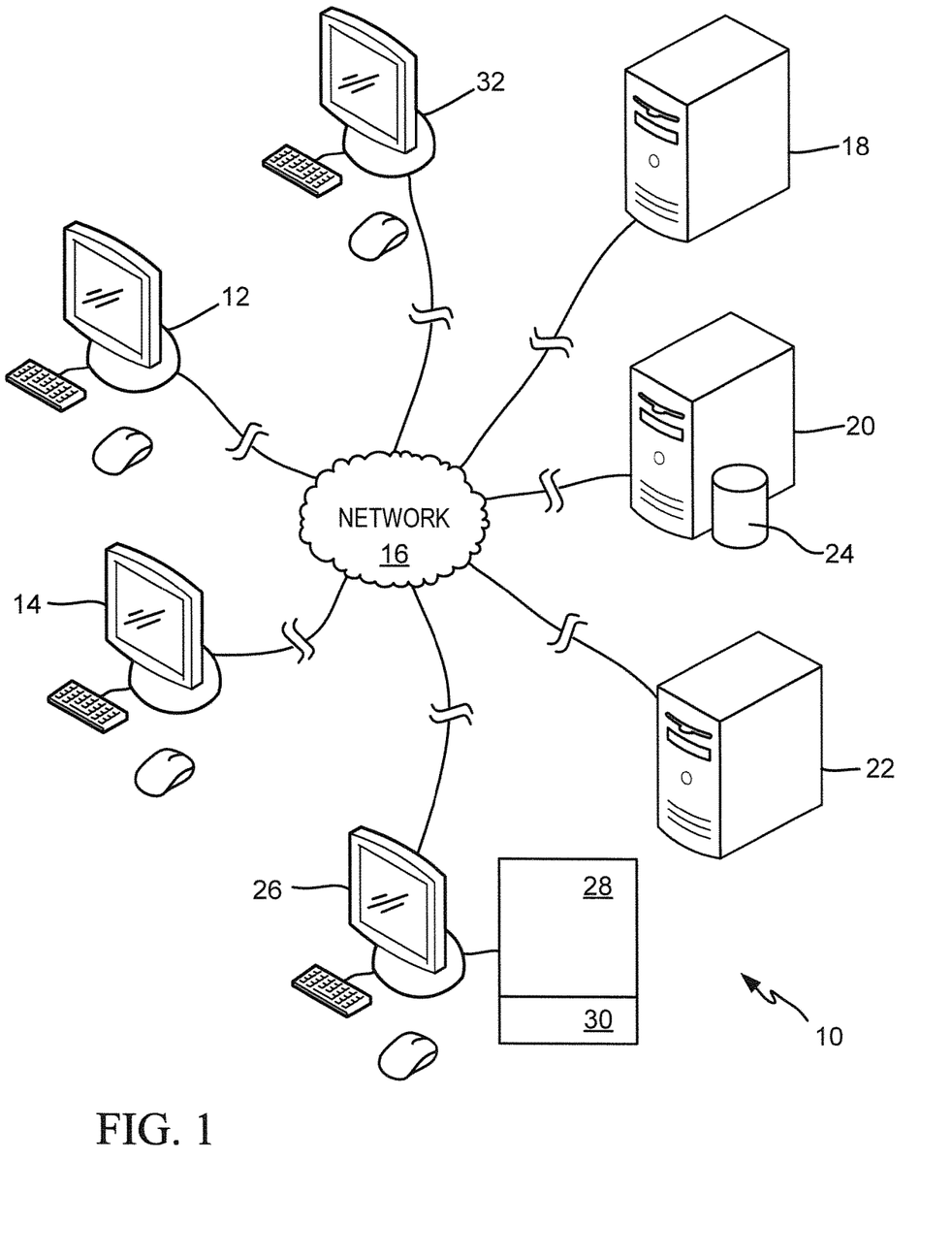
FIG. 1 is a schematic illustration of an exemplary operating environment in which various embodiments of the present invention may be implemented.

FIG. 1 is a schematic illustration of an exemplary operating environment in which various embodiments of the present invention may be implemented. The system 10 can include one or more user computers 12, 14, on which a web browser, procurement application, etc. may be executed. Although only two user computers 12, 14 are illustrated, any number of user computers can be network connected as part of the present system 10. Each user computer 12, 14 can be a general purpose personal computer, such as a personal desktop computer, laptop computer, etc. running a suitable operating system such as Microsoft Corp.'s Windows and/or Apple Corp.'s Macintosh operating systems, for example. According to alternate embodiments, one or more of the user computers 12, 14 can be a workstation computer running any of a variety of commercially-available UNIX or UNIX-like operating systems such as the various GNU/Linux operating systems. Alternatively, the user computers 12, 14 can optionally include another type of electronic device such as an Internet-enabled mobile telephone, and/or personal digital assistant, tablet computer, etc. capable of communicating via a communication network 16 and/or displaying and navigating web pages or other types of electronic documents.

The communication network 16 can be any type of network familiar to those skilled in the art that can support packetized data communications using any of a variety of commercially-available protocols, including without limitation TCP/IP, SNA, IPX, AppleTalk, and the like. The communication network 16 may be a local area network ("LAN"), including networking hardware such as local switches, routers (wired and/or wireless embodiments compliant with IEEE 802.1x protocols), and other suitable hardware to establish an Ethernet network, a Token-Ring network, etc.; a wide-area network ("WAN") involving Internet communications between remotely-located terminals over public switched telephone and/or cellular telephone infrastructure; or a combination thereof.

The system may also include one or more server computers 18, 20, 22 which can be general purpose computers and/or specialized server computers such as PC servers, UNIX servers, rack-mounted servers, etc. One or more of the servers 18, 20, 22 can optionally be dedicated to running applications, such as a business application, serving web content, etc. Such servers 18, 20, 22 may be used to process requests from user computers 12, 14, control access to resources of the servers 18, 20, 22, and perform any other desired function. Examples of other servers include, but are not limited to HTTP servers, FTP servers, CGI servers, database servers, Java servers, and the like. As such, the server(s) 18, 20, 22 can be configured to execute programs or scripts in response to the user computers 12, 14. As a specific example, a server 18 may be configured or otherwise programmed to execute a procurement application that can access so-called "punchout sites" managed by a third-party. The procurement application can be web-based, and may be implemented as one or more scripts or programs written in any programming language, such as Java™, C, C# or C++, and/or any scripting language, such as Perl, Python, or TCL, as well as combinations of any programming/scripting languages.

Another one of the server(s) 18, 20, 22 may also include a non-transitory, computer-readable medium storing a database application, including without limitation those commercially available from Oracle®, Microsoft®, Sybase®, IBM® and the like, which can process requests from database clients running on a user computer 12, 14. Although the database application and an associated database 24 of information concerning paint available for purchase is described herein as residing in the computer-readable medium of the server 20 for illustrative purposes, the present disclosure is not so limited. The database 24 of paint information can reside on any network-accessible terminal described herein. According to one embodiment, the database 24 can be a relational database, such as Oracle 12c, that is adapted to store, update, and retrieve data in response to SQL-formatted commands.

A tinter terminal 26 can also optionally be connected to the communication network 16. The tinter terminal 26 is operatively connected to control a paint mixing system 28, shown schematically in FIG. 1, which combines a plurality of different color components into a paint container to produce paint having the desired paint color specified by a customer. The tinter terminal 26 can be a general purpose personal computer, such as a personal desktop computer, laptop computer, etc. running a suitable operating system such as Microsoft Corp.'s Windows and/or Apple Corp.'s Macintosh operating systems, for example, specifically programmed to control the color components and quantity of each color component mixed together. The tinter terminal 26 can also be configured to transmit a formula of the paint produced over the communication network to be stored in a historical database documenting the purchase history of each customer.

An optical recognition component 30 can optionally be provided to the tinter terminal 26, paint mixing system 28, and/or another terminal in communication with the paint mixing system 28. The optical recognition component 30 can include a charge coupled device ("CCD"), complementary metal-oxide-semiconductor ("CMOS") device, or other digital image sensor that optically recognizes a color from a sample the customer desires to duplicate with the paint. Using the optical recognition component 30, the tinter terminal 26 can identify the formula comprising the various different colors to be combined, and in what quantities, to produce paint in the desired paint color specified by the user. According to alternate embodiments, the tinter terminal 26 can optionally be utilized in a brick-and-mortar paint store to allow for the manual selection of the desired paint color from a color palette of predefined colors regularly available for purchase from that paint vendor. According to yet other embodiments, the tinter terminal 26 can optionally receive a customer's desired paint color in a transmission conveyed over the communication network 16.

The tinter terminal 26 can be located at the same brick-and-mortar retail, wholesale, or other sales location where the paint can be acquired as a point-of-sale ("POS") terminal 32. The POS terminal 32 can include a scanner configured to interrogate a computer-readable code (e.g., barcode, RFID tag, etc.) to identify the sales price of the paint, and possibly other data concerning the paint itself. For instance, interrogation of the barcode can allow the POS terminal 32 to identify the formula including the plurality of individual colors and their respective quantities combined to achieve the desired paint color. According to alternate embodiments, the formula can be associated with a human-readable code (e.g., a serial number) that, when entered into the POS terminal 32, allows the POS terminal 32 to identify the formula for the desired paint color.

Figure 2:
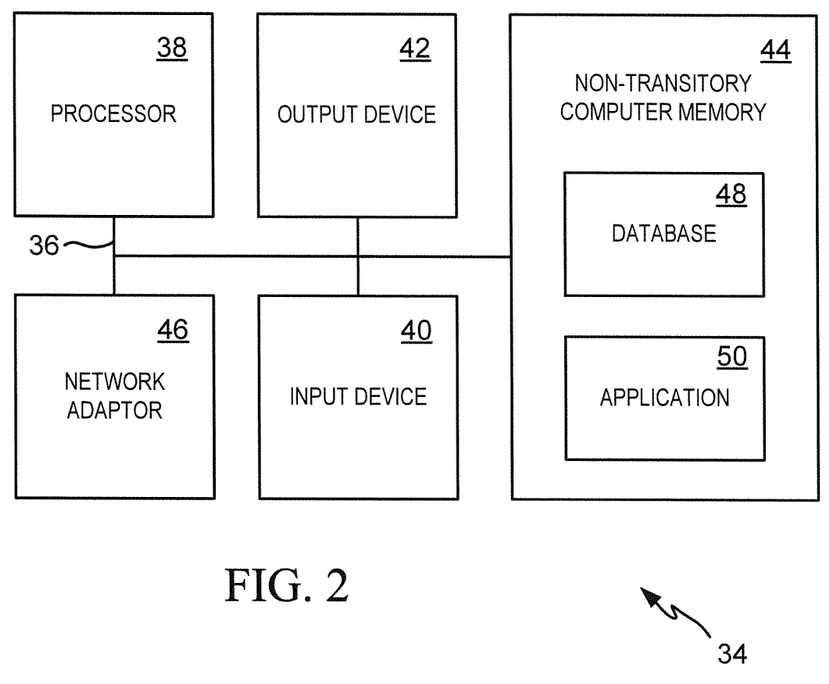
FIG. 2 is a block diagram illustrating an exemplary arrangement of a computer terminal that can be utilized to implement at least one of the computer terminals and/or servers described herein.

FIG. 2 is a block diagram illustrating an exemplary arrangement of a computer terminal 34, which can be utilized to implement any of the computer terminals and/or servers, etc. described above. The computer terminal 34 includes hardware components that may be electrically coupled together to communicate with each other via a bus 36. One or more computer processing units 38 execute computer-readable program code to carry out method steps. One or more input devices 40 (e.g., a mouse, a keyboard, barcode or other code scanner, optical color recognition component 30, etc.) facilitate manual user entry of information to the computer terminal 34, and one or more output devices 42 (e.g., a display device, a printer, etc.) generate output to the user. The computer terminal 34 may also include one or more storage devices 44, such as for example non-transitory computer memory. By way of example, storage device(s) 44 may be one or an array of hard disk drives, optical storage devices, solid-state storage devices such as a random access memory ("RAM") and/or a read-only memory ("ROM"), which can be programmable, flash-updateable and/or the like. A network adaptor 46 (e.g., a modem, a network card (wireless or wired), an infra-red communication device, fiber optic communication device, etc.) facilitates the communication of data, information, and/or any content electronically between network-connected devices over the communication network 16.

The storage device 44 can store, as appropriate, computer-readable program code (e.g., operating system, server software, etc.) coordinating operation of the various components provided to the computer 34 terminal. Additionally, the storage device 44 can optionally store applications constituting computer readable program code for at least one of a database 48 and an application 50 such as a web browser, enterprise paint procurement application through which paint can be purchased for an institutional customer, etc.

Figure 3:
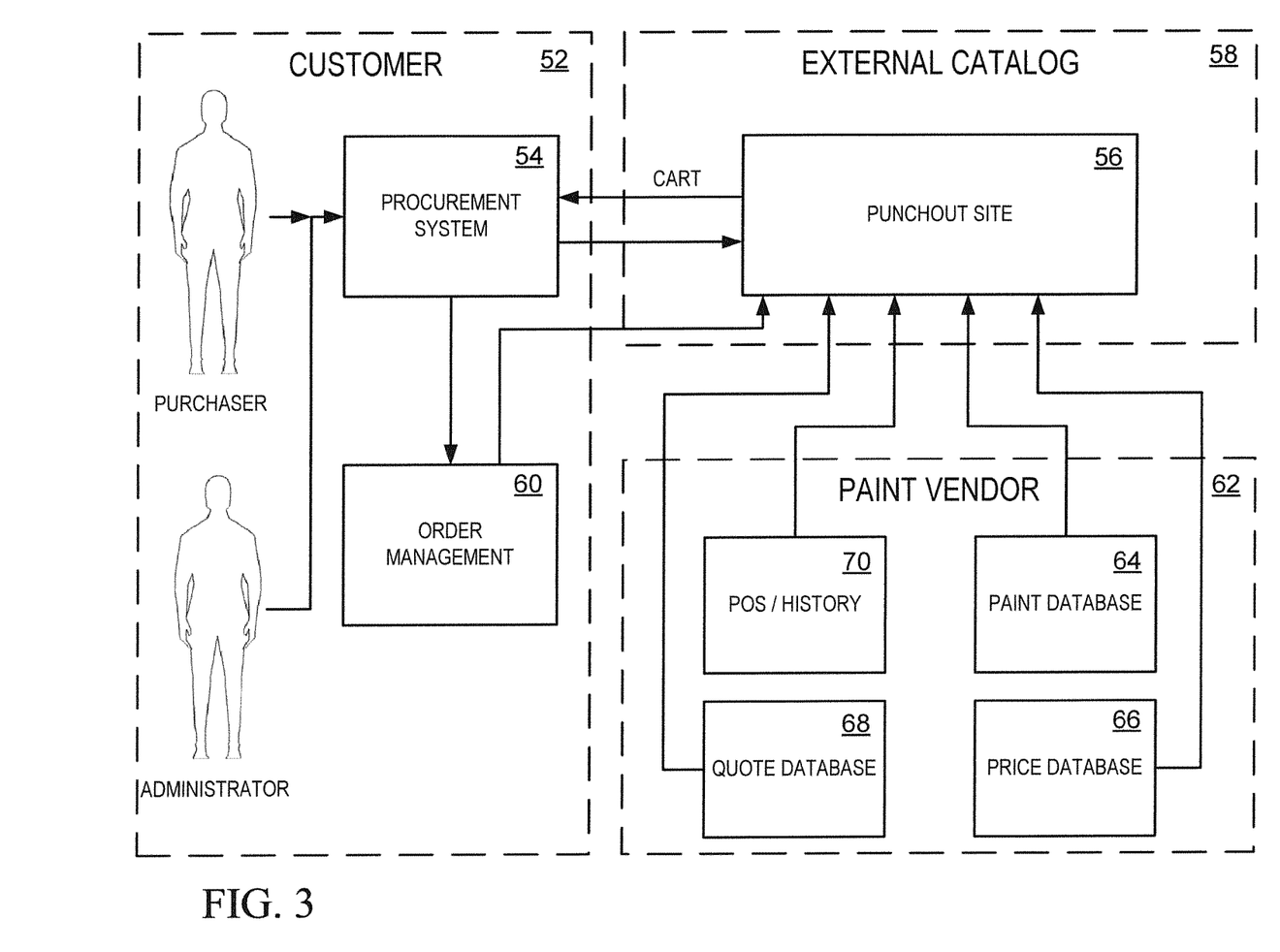
FIG. 3 is a block diagram illustrating, at a high-level, functional components of a system for facilitating the sale of paint to an institutional customer through an enterprise procurement system with access to a punchout site.

FIG. 3 is a block diagram illustrating, at a high-level, functional components of a system for facilitating the sale of paint to an institutional customer 52 through an enterprise procurement system 54 running on a computer terminal 12, 14 operated by, or on behalf of a purchasing agent of the customer 52. An administrator can optionally configure the procurement system to impose purchasing guidelines and/or restrictions on purchases made through the procurement system 54, optionally requiring prior authorization from the administrator to exceed the purchasing authority assigned to the purchasing agent.

The procurement system 54 can manage catalog information from an internal (i.e., maintained by or on behalf of the customer 52) order management tool 60, which can optionally be hosted onsite at the customer's place of business, that stores the customer's order history and perhaps other data such as paint consumption data, paint consumption forecasts, etc. However, the procurement system 54 used by that customer 52 can also access, over the communication network 16, a punchout site 56 for an external paint catalog 58 with paint available from a third-party paint vendor 62 such as The Sherwin-Williams Co. of Cleveland, Ohio. The punchout site 56 includes paint prices, available colors, available quantities, and other detailed information collected from a plurality of data sources affiliated with one or more third parties over the communication network 16. Thus, the punchout site 56 can be hosted by a party other than the customer and/or proprietor of the procurement system 54, and can access and compile information from databases external to the procurement system 54 and maintained by a party other than the customer and/or proprietor of the procurement system 54, such as a paint vendor or supplier. For the sake of brevity and clarity, the following discussion will involve the purchase of paint by a customer from a punchout site 56 hosted on server 18 by one party, and the punchout site acquires data from one or more databases 24 residing on the server 20 operated by, or on behalf of a third-party paint vendor.

The paint vendor 62 hosts, or has hosted a plurality of network accessible resources that are used to facilitate the sale of paint to the customer 52 through the punchout site 56. As shown in FIG. 3, a paint database 64 maintains paint information for paint and painting-related products (e.g., rollers, brushes, tarps, tape, etc.) available for purchase. Included in the paint database 64 is a color palate of predefined paint colors regularly available for purchase from a paint vendor 62. The formula for each predefined paint color (e.g., each hue and the quantity thereof to be combined to produce pain in the predefined colors), and a standardized color value within a color gamut of electronic display devices are also stored in the paint database 64. Examples of standardized color values that can be included for each color entry in the paint database 64 include, but are not limited to red-green-blue ("RGB") values, HEX color codes, hue-saturation-lightness ("HSL") values, and the like.

A price database 66 maintained by or on behalf of the paint vendor 62 stores standard price information for each of the paints in the paint database 64. "Standard" price information includes paint prices that are not customer specific, and are approved to be widely available to any customers with a desire to make an arm-length paint transactions with the paint vendor 62. In other words, the prices in the price database 66 can be thought of as the base price, or retail price of the paint. This standard price information can be based on sales models taking into account factors such as anticipated and/or historical sales for each paint, advertised promotions concerning one or more of the paints, the manufacturing cost of each paint, the capital invested to bring each paint to market, competition for each paint, any special properties possessed by the paints, demand for the paints, etc.

Certain customers that purchase large volumes of paint, make frequent purchases of paint, or are otherwise valuable long-term customers may be offered a purchase price that is lower than the standard price for the same paint stored in the price database 66. Large paint purchases or other unusual circumstances may justify the provision of a price quote to the customer 52 to assist the customer in making a financially-prudent purchase. In such instances, a sales representative affiliated with the paint vendor 62 can present the customer with the quotation and enter that quotation into the quote database 68. Besides the sales price, the quotation can include the exact quantity and price for each product requested by the customer. The server 18, hosting the punchout site 56 can optionally automatically initiate an occasional or regular request for quoted price information from active quotes that have not yet expired in the quote database 68 over the communication network 16 without manual user intervention. For example, such an update request can be initiated once or twice each day, every hour, every 15 minutes, every minute, etc. According to alternate embodiments, the quoted prices and other terms included in a quotation can be automatically transmitted to the server 18 hosting the punchout site 56 in response to entry of that quotation into the quote database 68. Again, automatic transmission is triggered in response to the entry of the quotation, without manual intervention specifically and primarily aimed at triggering the conveyance of the quoted sales information to the punchout site 56. In this way, the punchout site 56 is regularly and automatically updated contemporaneously (e.g., substantially in real time) with the commitment of quotations to the quote database 68. The quoted price is customer specific, and requires the approval of the paint vendor 62. Any quoted prices from the quote database 68 are saved in a user account corresponding to that customer 52 on the punchout site 56, and override the general, base price received from the price database 66. The customer 52 will be charged the quoted price and abide by any other quoted terms from the quote database 68 in place of any conflicting prices or other terms from the price database 66.

In addition to the predefined colors regularly available for purchase from the color palate of the paint vendor 62, the customer 52 may wish to purchase paint in a desired paint color that is not one of the predefined colors in the color palate of the paint vendor 62. The customer 52 can optionally provide the paint vendor 62 with the formula specifying which hues are to be combined, and in what quantities, to provide the volume of paint to be produced with the desired color. According to alternate embodiments, the customer 52 can provide the paint vendor 62 with an object in the desired color. The optical recognition component 30 can optionally be utilized to capture the desired color and a computer-implemented analysis of the captured image can be performed to determine the formula for the desired color. Yet other embodiments can involve performing the analysis on an existing electronic image to determine the formula for producing paint in a color appearing in that image.

Regardless of the manner in which the color is matched, the formula for the desired color can be entered into the user account of that customer in a POS/history database 70. For instance, scanning a barcode or other computer-readable code at the POS terminal 32 can result in the POS terminal 32 transmitting the formula into the POS/history database 70 to be saved in association with the user account for that customer 52. If the paint is to be prepared using the paint mixing system 28, the tinter terminal 26 can transmit the formula to be saved in the POS/history database 70 in association with the user account for that customer 52. If an order is placed by the customer 52 through the procurement system 54, the formula can also optionally be stored locally by the order management tool 60.

Additionally, the formula for this custom paint color desired by the customer 52 can be converted into a standardized color within the color gamut of common electronic display devices, thus allowing the desired color to be displayed to the customer 52 in the future. The standardized color value can comply with any standardized color labeling system such as RGB, HEX, HSL, etc., and should represent a displayable color that closely approximates the desired paint color when displayed by an electronic display device. Even if the desired paint color does not have a discrete color value within the color gamut of the electronic display device (e.g., the resolution of the display device is such that the desired paint color falls between contiguous color values), the standardized color value can be chosen as the closest discrete value within the color gamut of the electronic display device. Conversion of the formula into the standardized color value and storage of the standardized color value in the POS/history database 70 can optionally occur automatically, without manual performance of a step primarily intended to initiate conversion, in response to at least one of: a sale of paint having the desired paint color, and production of paint having the desired paint color.

In addition to storing the formula and/or standardized color value of the desired paint color in the POS/history database 70, the customer 52 can optionally specify and save a custom name of the desired paint color, the formula, and/or the standardized color value in the database entry for the user account associated with that customer 52. At a time when a paint purchase is to be made once the desired paint color has been added to the customer's user account, the customer 52 can log into the proper user account via the procurement system 54 and the desired paint color can be received by the punchout site 56 from the POS/history database 70 or another source. The desired paint color so added can then be presented to the customer 52, alongside only other custom colors specific to that user or in combination with one or more predefined colors in the color palate of the paint vendor 62, as described in detail below.

Figure 4:
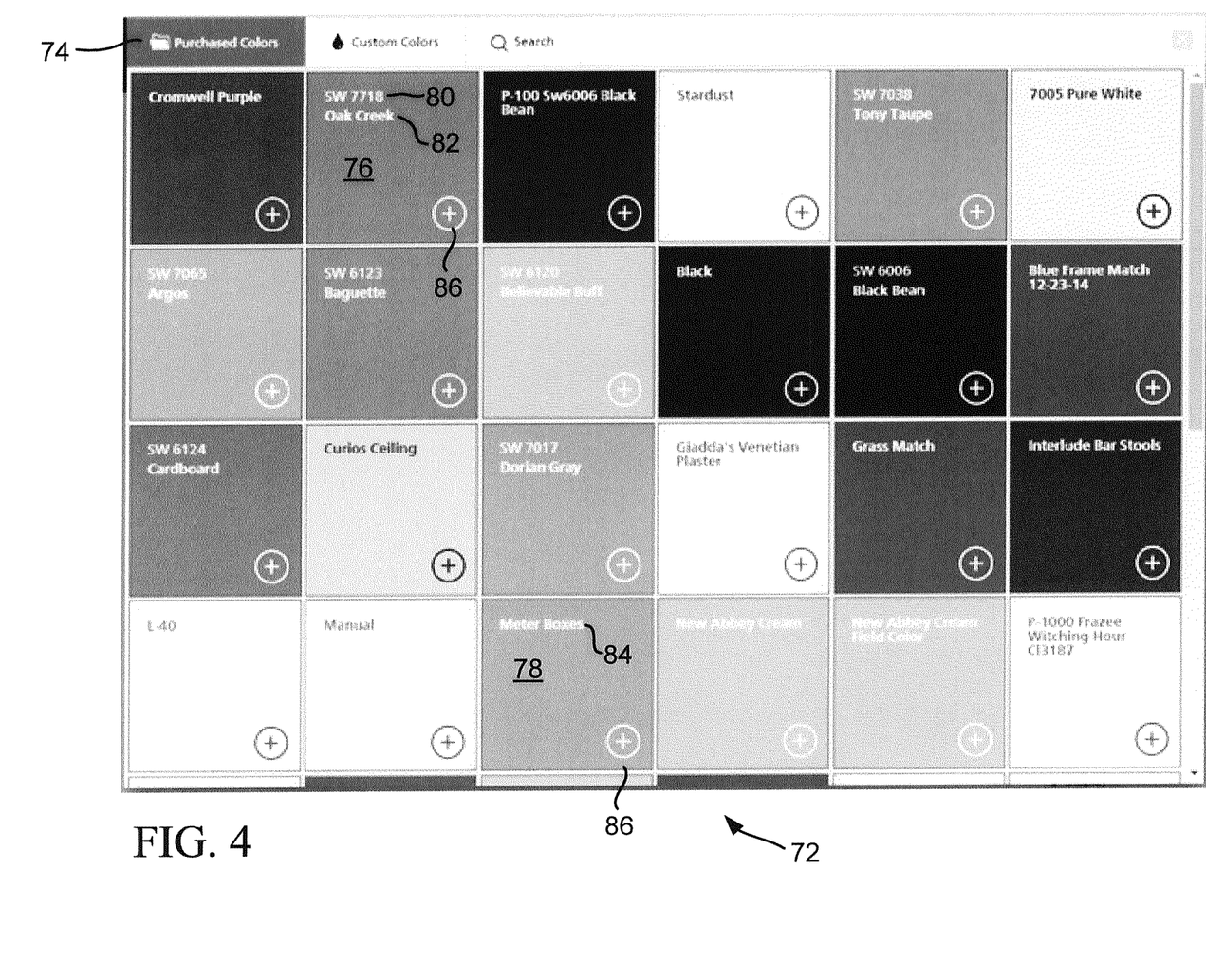
FIG. 4 shows a color selection tool populated with previously-purchased paint colors received from a punchout site, including colors predefined by a paint vendor and custom colors defined by the customer.

Use of the external catalog on the punchout site 56 by a customer 52 to purchase a predefined color of paint and a custom color of paint will be described hereinafter with reference to FIGS. 4-6. As an initial matter, if a complete price quotation has been entered into the quote database 68 for a specific job and the punchout site 56 has since been updated accordingly, an identifier (e.g., quote reference number) corresponding to that price quotation can optionally be transmitted by the punchout site 56 to be received by the procurement system 54. The identifier, if selected by the purchaser via the procurement system 54, will return a pre-populated order with every product, in the quoted quantities, with the specified sheen, etc., specified for that specific job. The only information required to complete an order in accordance with the terms of such a price quotation is to select the color, which is accomplished as described in detail below. If such a price quotation for a complete job does not exist, the purchaser can proceed to manually populate the order with the desired paint and/or other products.

To initially enter the custom paint color into the customer's user account maintained by the paint vendor 62, on the punchout site 56, or in any other network-accessible database, the customer 52 can subject a sample of the desired color for inspection by the optical recognition component 30 and subsequent spectral analysis, specify the formula, or otherwise make the formula of the desired paint color known to the paint vendor 62. In response to receiving the formula, one of the servers 18, 20, 22 or other computer terminal can automatically translate the formula into a standardized color value within a color gamut of the electronic display device. This conversion can be accomplished in any desired manner, such as for example by use of a color engine which which uses code and color data to generate displayable RGB values.

For example, the color engine references a standard curve that is the signature or representation of a particular color. The standard curves may be accessed from an existing color generation or matching system, such as provided for example by X-Rite Incorporated. Color curves are processed from pre-existing paint tints using a RGB database or conversion algorithm, and the standard curves are converted to RGB values for display. Preferably the RGB values are determined from previous purchase tint records so that the displayed colors are an exact match to the previously purchased paint.

This standardized color value is stored in a network-accessible database such as the POS/history database 70 maintained by, or on behalf of the paint vendor 62; on the punchout site 56; and/or any other network-accessible storage location.

To purchase paint in the custom, desired paint color a purchaser employed by the customer 52 can log into the procurement system 54 by entering the proper authenticating information such as a username and password in a conventional manner. Once logged in, the purchaser can provide input to the procurement system 54 indicating an intent to purchase paint. This input can cause the procurement system 54 to transmit a request to access the punchout site 56 hosted by the server 18 over the communication network 16, resulting in the server 18 transmitting content suitable to present the purchaser with a color selection tool 72 such as that shown in FIG. 4. The color selection tool 72 in FIG. 4 displays a history of colors of paint that were previously-purchased by the customer 52. Included on the "Purchased Colors" tab 74 of the color selection tool 72 are swatches of both predefined colors 76 included in a color palate of colors regularly available for purchase from that paint vendor 62, and of custom paint colors 78 previously desired by the customer 52 and entered as described herein.

The swatches of predefined colors 76 include a vendor identification number 80, which can optionally be specific to the paint vendor 62, and a vendor-assigned color name 82. The color of the swatches of predefined colors 76 can be generated based on the formula of the respective colors, a standardized color code (e.g., RGB value) based on the formula, or manually selected by the paint vendor 62 to accurately depict the actual paint color when displayed by the display device of the user computer 12, for example.

The swatches of custom colors 78 include a customer-assigned name 84, and can optionally be assigned a value by the customer 52 and/or paint vendor 62 for reference on the punchout site 56. The color of the swatches of custom colors 78 displayed in the color selection tool 72 can be based on the formula, and/or the standardized color value generated by automatically translating the formula as described above. The vendor identification number 80, vendor-assigned name 82, customer-assigned name 84 and/or reference number, generic name of the most-similar base color, etc. can each constitute a search string that can be used in a query for colors by the customer 52. As shown in FIG. 6, a keyword search for the color "blue" has been initiated by entering that keyword 81 into a search field 85 of the color selection tool 72.

Each color that is available for purchase via the color selection tool 72 generated based on content received from the punchout site 56 includes a selection icon 86 that, when selected by the purchaser, identifies the respective color as that desired to be purchased. The selected color is then established as the color and the purchasing process proceeds to allow for selection of any remaining paint parameters such as volume (e.g., quart, gallon, 5 gallons, etc.), sheen (e.g., flat, semi-gloss, satin, etc.), and environment (e.g., indoor, outdoor), for example.

Figure 5:
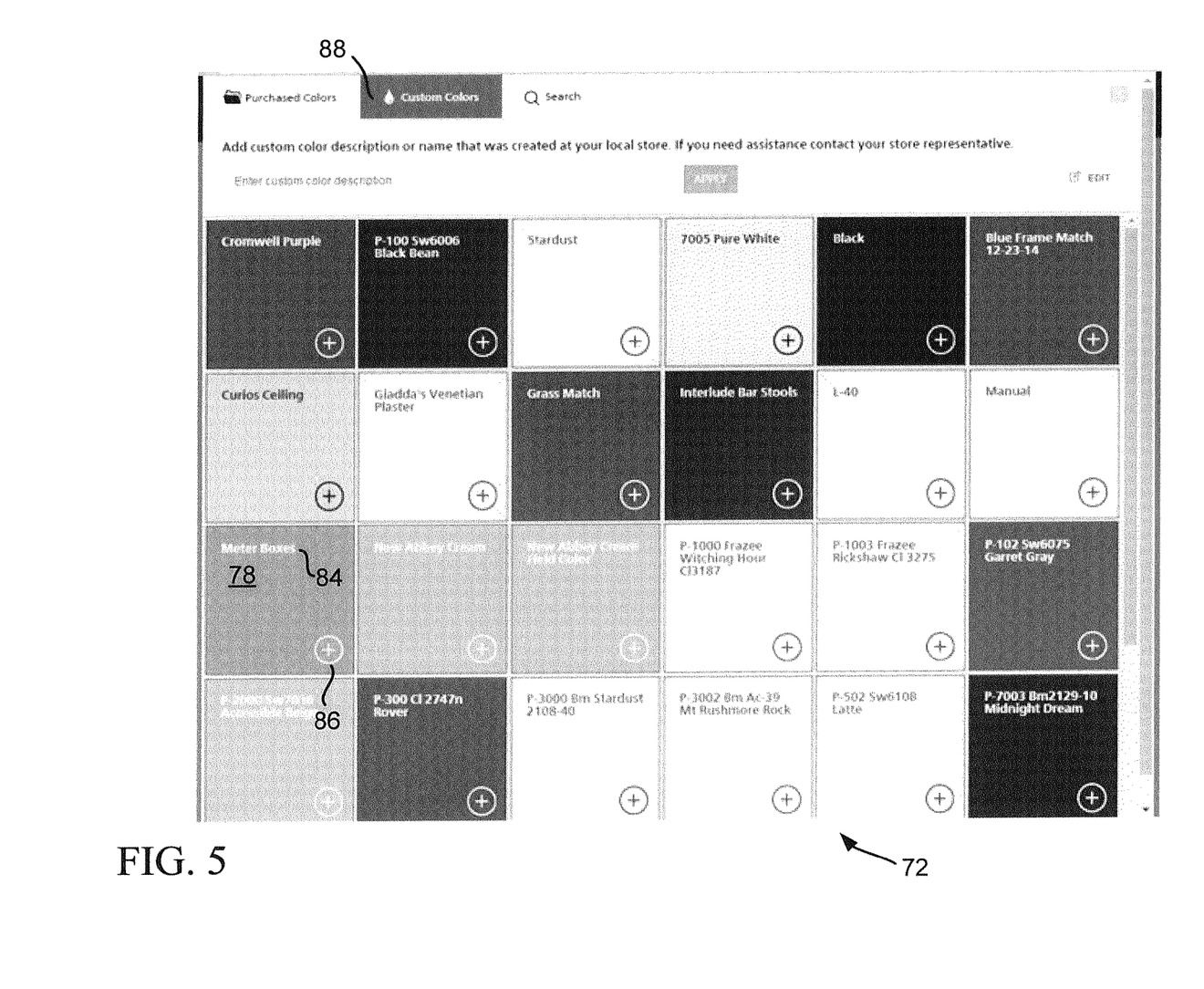
FIG. 5 shows a color selection tool limited to custom paint colors previously-entered by a customer from a punchout site.
Figure 6:
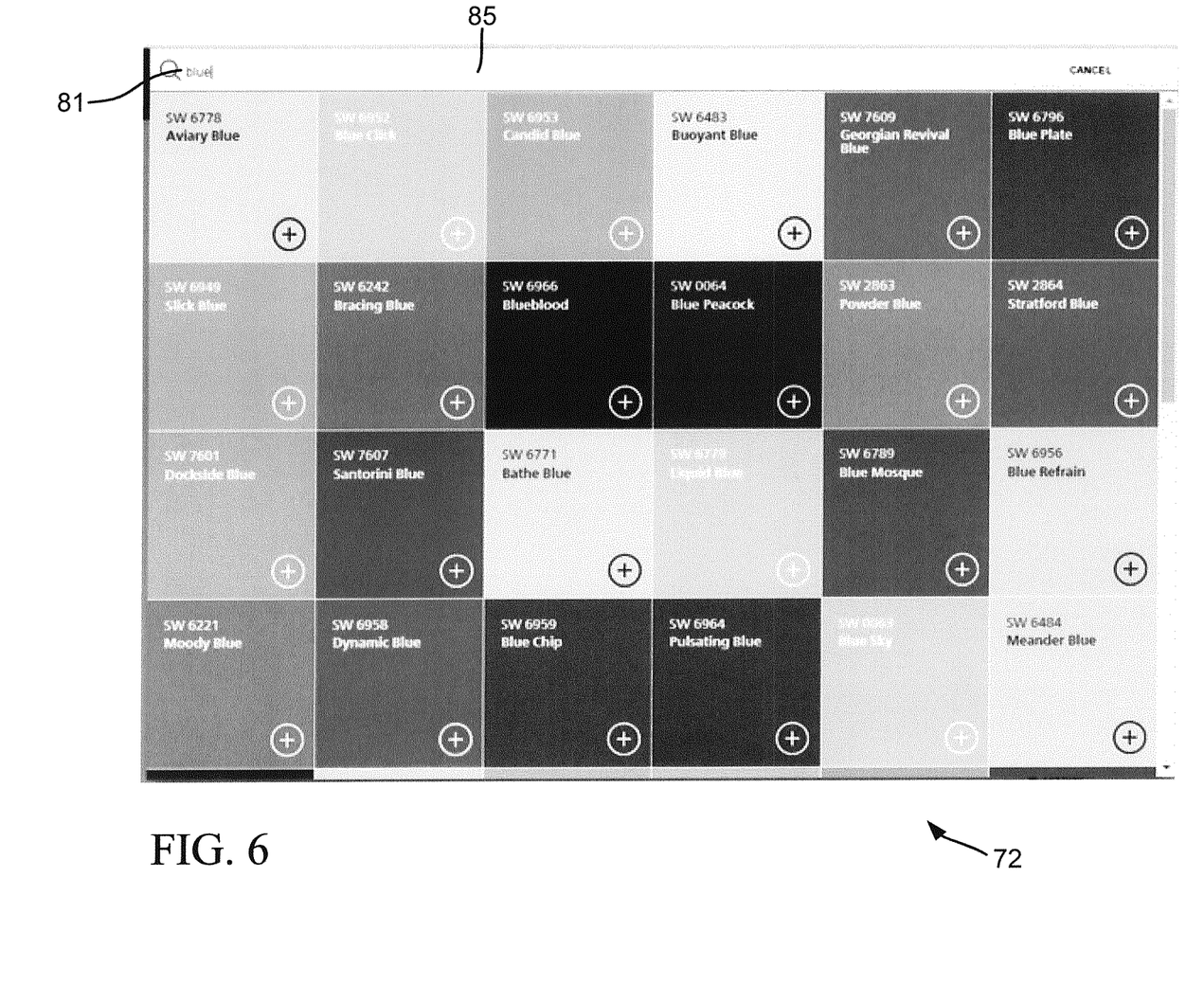
FIG. 6 shows a color selection tool limited to predefined colors in a paint vendor's palate satisfying a search string.

If the customer 52 is interested in only custom colors it previously defined, the customer 52 can select the "Custom Colors" tab 88 to limit the available colors to only those that the customer defined, as shown in FIG. 5. Predefined colors in the paint vendor's palate are excluded from the colors that selectable in the color selection tool 72, in which only the custom colors are selectable. The predetermined colors in the paint vendor's color palate can be omitted altogether, grayed out or otherwise rendered un-selectable, or excluded from the content of the punchout site 56 transmitted over the communication network 16 to the procurement system 54 to be displayed to the purchaser. Again, the swatches of custom colors 78 include the customer-specified name 84 and the selection icon 86.

Once the paint color has been selected and any remaining paint parameters have been selected via the color selection tool 72, the price of the purchase is presented to the purchaser for review prior to submitting the order. The price presented will reflect the price specified in a quotation entered into the quote database 68 and used to update the punchout site 56, if such a quote exists. Otherwise, the standard pricing from the price database 66 used to update the punchout site 56 will be presented.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of maintaining a preview of a paint color to be displayed by an electronic display device, the method comprising:
receiving a formula corresponding to a desired paint color selected by a customer that is not included in a color palette of predefined colors regularly available for purchase from a paint supplier, the formula defining a plurality of different color components combinable into a paint container to produce paint having the desired paint color;
based on the formula, generating a standardized color value within a color gamut of the electronic display device for the desired paint color, the standardized color value representing a displayable color that closely approximates the desired paint color when displayed by the electronic display device;
storing the standardized color value in a network-accessible database entry specific to the customer; and
in response to a request issued from a procurement system over a communication network during a subsequent purchase of paint having the desired paint color, transmitting content over the communication network conveying the standardized color value to the electronic display device and causing the displayable color represented by the standardized color value to be displayed by the electronic display device.

2. The method of claim 1, wherein the formula is received as part of a data transmission by a point-of-sale terminal as part of a sales transaction involving paint having the desired paint color.

3. The method of claim 2, wherein the formula is created according to a process involving optical color recognition of the desired paint color.

4. The method of claim 1, wherein the formula is received as part of a data transmission by a tinting system that combines a plurality of different color components to produce paint having the desired paint color as part of a paint production process.

5. The method of claim 4, wherein the formula is created according to a process involving optical color recognition of the desired paint color.

6. The method of claim 1, wherein generating the standardized color value comprises translating a plurality of different color components that are to be combined to produce paint having the desired paint color into red-green-blue ("RGB") values.

7. The method of claim 1, wherein generating the standardized color value comprises translating a plurality of different color components that are to be combined to produce paint having the desired paint color into a hexadecimal color code.

8. The method of claim 1, wherein said storing the standardized color value in the network-accessible database entry comprises:
identifying a user account specific to the customer; and
adding a name of the desired paint color, the formula, and the standardized color value as part of the database entry to the user account in response to a purchase or production of paint having the desired paint color.

9. The method of claim 8, wherein the user account is included on a punchout site hosted for the paint supplier that is accessible by the customer via a procurement system of a third party utilized by the customer.

10. The method of claim 8, wherein the name of the desired paint color is specified by the customer.

11. The method of claim 1, wherein the desired paint color does not have a discrete color value within a color gamut of the electronic display device, and the displayable color has a standardized color value within the color gamut of the electronic display device.

12. The method of claim 1, wherein the formula is automatically converted into the standardized color value and stored in the database entry in response to at least one of a sale of paint having the desired paint color and production of paint having the desired paint color.

13. The method of claim 1 further comprising:
in response to the request issued from a procurement system, enabling selection of the desired paint color for purchase by the customer from a catalog on a punchout site accessed by the customer through the procurement system.

14. The method of claim 13 further comprising:
limiting selectable colors presented to the customer through the punchout site to only custom paint colors that are not included in the color palette of predefined colors regularly available for purchase from the paint supplier.

15. The method of claim 13 further comprising:
in response to the request issued from the procurement system, transmitting content over the communication network conveying additional color values corresponding to the predefined colors included in the color palette regularly available for purchase from the paint supplier to be concurrently presented with the desire paint color to the customer on the punchout site.

16. The method of claim 15, wherein the additional color values correspond to a plurality of the predefined colors that were previously purchased by the customer.

17. A computer program product, comprising a computer-usable, non-transitory tangible storage medium having a computer-readable program code embodied therein, said computer-readable program code being executed to carry out a computer based method for maintaining a preview of a paint color to be displayed by an electronic display device comprising:
receiving a formula corresponding to a desired paint color selected by a customer that is not included in a color palette of predefined colors regularly available for purchase from a paint supplier, the formula defining a plurality of different color components combinable into a paint container to produce paint having the desired paint color;
based on the formula, generating a standardized color value within a color gamut of the electronic display device for the desired paint color, the standardized color value representing a displayable color that closely approximates the desired paint color when displayed by the electronic display device;
storing the standardized color value in a network-accessible database entry specific to the customer; and
in response to a request issued from a procurement system a communication network during a subsequent purchase of paint having the desired paint color, transmitting content over the communication network conveying the standardized color value to the electronic display device and causing the displayable color represented by the standardized color value to be displayed by the electronic display device.

18. The computer program product of claim 17, wherein the formula is received as part of a data transmission by a point-of-sale terminal as part of a sales transaction involving paint having the desired paint color.

19. The computer program product of claim 18, wherein the formula is created according to a process involving optical color recognition of the desired paint color.

20. The computer program product of claim 17, wherein the formula is received as part of a data transmission by a tinting system that combines a plurality of different color components to produce paint having the desired paint color as part of a paint production process.

21. The computer program product of claim 20, wherein the formula is created according to a process involving optical color recognition of the desired paint color.

22. The computer program product of claim 17, wherein generating the standardized color value comprises translating a plurality of different color components that are to be combined to produce paint having the desired paint color into red-green-blue ("RGB") values.

23. The computer program product of claim 17, wherein generating the standardized color value comprises translating a plurality of different color components that are to be combined to produce paint having the desired paint color into a hexadecimal color code.

\* \* \* \* \*